United States Patent
Wilson et al.

(10) Patent No.: US 12,358,436 B2
(45) Date of Patent: Jul. 15, 2025

(54) MODULAR DISPLAY ATTACHMENT

(71) Applicant: Volvo Truck Corporation, Gothenburg (SE)

(72) Inventors: Andreas Wilson, Gothenburg (SE); Zoran Vasiloski, Gothenburg (SE); Linus Larsson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/469,709

(22) Filed: Sep. 19, 2023

(65) Prior Publication Data
US 2024/0101043 A1 Mar. 28, 2024

(30) Foreign Application Priority Data
Sep. 28, 2022 (EP) .................................. 22198456

(51) Int. Cl.
*B60R 11/02* (2006.01)
*B60R 11/00* (2006.01)

(52) U.S. Cl.
CPC ... *B60R 11/0235* (2013.01); *B60R 2011/0022* (2013.01); *B60R 2011/0064* (2013.01)

(58) Field of Classification Search
CPC ......... B60R 11/0235; B60R 2011/0022; B60R 2011/0064
See application file for complete search history.

(56) References Cited

U.S. PATENT DOCUMENTS

| | | | |
|---|---|---|---|
| 2004/0124317 A1* | 7/2004 | Wallaker | B60R 11/0235 248/27.1 |
| 2005/0045794 A1* | 3/2005 | Richter | F16M 13/00 248/371 |
| 2013/0043290 A1 | 2/2013 | Prater et al. | |
| 2014/0339385 A1* | 11/2014 | Boer | B64D 47/00 248/222.52 |
| 2020/0262356 A1* | 8/2020 | Mitchell, Jr. | H05K 5/0017 |
| 2023/0286447 A1* | 9/2023 | Harmon | B60R 11/0217 |

FOREIGN PATENT DOCUMENTS

FR 2875575 A3 3/2006

OTHER PUBLICATIONS

Extended European Search Report for European Patent Application No. 22198456.0, mailed Mar. 16, 2023, 6 pages.

* cited by examiner

*Primary Examiner* — Amy J. Sterling
(74) *Attorney, Agent, or Firm* — Withrow & Terranova, PLLC (57) ABSTRACT

An attachment of a display for use in a vehicle is provided. The attachment comprising a rigid bracket having a first end with a connecting flange and a second end with two flat angle brackets. A display carrier configured to support a display. An adapter plate with a plurality of slots and fixation ears. Each fixation ear being fixedly mounted into a slot. The adapter plate is mounted on the display carrier, and at least a fixation ear cooperates with a flat angle bracket.

18 Claims, 6 Drawing Sheets

MODULAR DISPLAY ATTACHMENT

RELATED APPLICATIONS

This present application claims priority to European Patent Application No. 22198456.0, filed on Sep. 28, 2022, and entitled "MODULAR DISPLAY ATTACHMENT," which is incorporated herein by reference in its entirety.

TECHNICAL FIELD

The disclosure relates generally to vehicle mounts. In particular aspects, the disclosure relates to modular display attachments or to other devices such as keypad, joystick, phone holder, etc. The disclosure can be applied in heavy-duty vehicles, such as trucks, buses, and construction equipment. Although the disclosure may be described with respect to a particular vehicle, the disclosure is not restricted to any particular vehicle.

BACKGROUND

In a vehicle, particularly in heavy-duty vehicles, displays are commonly used for driving assistance. For example, a display can be connected to a camera for the observation of dead angles. The display(s) is (are) most often integrated into or mounted on the dashboard.

The driver needs to twist and/or lower the head while driving to look at this (these) screen(s). The position of the display(s) is therefore not optimal.

Another disadvantage of this solution is that the display is not easy to mount, dismount and/or change.

Furthermore, the display cannot usually be oriented to suit the size and driving position of the driver.

There is a need for a display mounting system with an adjustable mechanism that can be a type of hinge that angles display manually by driver, ball-joint or other solution. The system has to be modular so that it can be used for many displays/devices. Preferably, this system minimizes the amount of unique components in order to decrease the part and tool cost and the environmental footprint.

SUMMARY

According to a first aspect of the disclosure, an attachment of a display for use in a vehicle, may comprise: a rigid bracket having a first end with a connecting flange and a second end with two flat angle brackets, a display carrier, an adapter plate with a plurality of slots and fixation ears, each fixation ear being fixedly mounted into a slot, wherein the adapter plate is mounted on the display carrier, and wherein at least a fixation ear cooperates with a flat angle bracket. The first aspect of the disclosure may seek to provide a universal attachment structure and to minimize the amount of specific pieces for a display.

In some examples, each flat angle bracket may comprise a first arm and a second arm. There may be two first arms and two second arms corresponding to a two flat angle brackets. In some examples, first arms are in the same plane and are aligned and wherein both seconds arms are parallel to each other and on the same side of the plane including the first arms. This structure allows to pivot the adapter plate around an axle formed perpendicular to the second arms or to fixedly mount the adapter plate on the first arms. In this example, advantageously each first arm and each second arm may have at least one fixing hole, and at least two fixing holes corresponding to both the first arms and to both the second arms may be coaxial.

In some examples, the display carrier may comprise at least three threaded holes, and the adapter plate may comprise at least three fixing holes being coincident with the at least three threaded holes. In this way, the adapter plate may be screwed onto the display carrier so that the display carrier can be securely fixed but can also be removed for maintenance of the display.

In a preferred example, the adapter plate may comprise a first set of slots running in a first direction and a second set of slots running in a second direction perpendicular to the first direction. In this way, a hinge can be formed according to the first direction or according to the second direction. In this example, at least a slot of the first set of slots may superimpose a slot of the second set of slots, thus forming a cross. On the place of this cross, it is possible to mount a fixation ear according to a first orientation or according to a second orientation.

The adapter plate may comprise a central opening. The connection of the display can be made through this opening.

Advantageously, the slots of the adapter plate are similar. In this way, the fixation ears can be standardized.

According to an example, each fixation ear may comprise a base adapted to fit into a slot and a body with a fixing hole. The fixation ears can be mounted in the same way on all the slots.

For a rigid construction, the adapter plate and/or the fixation ears may be made by cutting a sheet of metal.

For a good connection between a fixation ear and the adapter plate, the adapter plate and the fixation ears may be made from the same metal and may be welded together.

According to a second aspect of the disclosure, a display assembly may comprise: a display with a screen and a back portion, and an attachment as described hereabove.

In some examples, the display assembly may comprise a first cover covering at least partially the display carrier and the back portion of the display and/or a second cover covering at least partially the rigid bracket. The first cover and/or the second cover may have an esthetic function but may also have a protective function.

In some examples, the adapter plate may comprise a central opening and the back portion of the display comprises a connector, and the central opening of the adapter plate may surround the connector.

According to a third aspect of the disclosure, a vehicle may comprise a display assembly as described hereabove.

The connecting flange of the rigid bracket of the attachment may be fixed on an A-pillar of the vehicle. This position is ergonomic for the driver and does not penalize the safety since it does not hide the road.

Advantageously, the connecting flange of the rigid bracket of the attachment may be fixed on the body in white of the vehicle.

The connecting flange of the rigid bracket of attachment may be screwed on the body of the vehicle so that it can be removed if no more useful.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

Figure 1:
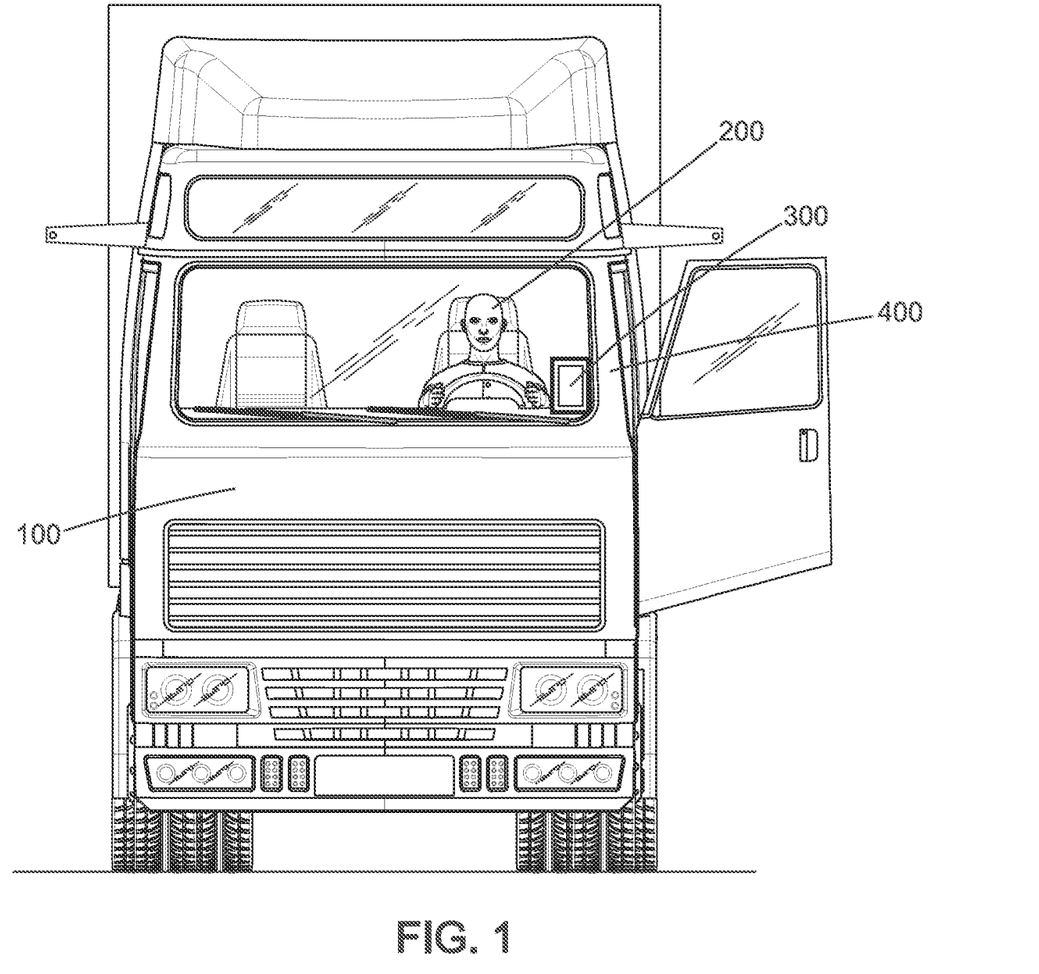
FIG. 1 is an exemplary vehicle according to one example.

FIG. 1 is a front view of a vehicle, for example a truck 100, with a driver 200. This vehicle comprises an inside display installation assembly 300 with a display and an attachment for the mounting of the display on a A-pillar 400 of the vehicle.

When he drives the vehicle, the driver observes the road and also both sides outside the vehicle. In some circumstances, there is also a need to observe dead angles. A camera may be arranged outside the vehicle and the display installation assembly 300 may be used to show the images taken by the camera.

The present disclosure proposes to mount the display on the A-pillar 400 of the vehicle. This position is ergonomic since the driver can see the display with a simple eye movement and this position is also safe since the display does not obstruct the view on the road.

FIGS. 2-14 show more in detail how to mount the display inside the vehicle and the present disclosure gives example attachment with a minimized amount of unique components.

Figure 2:
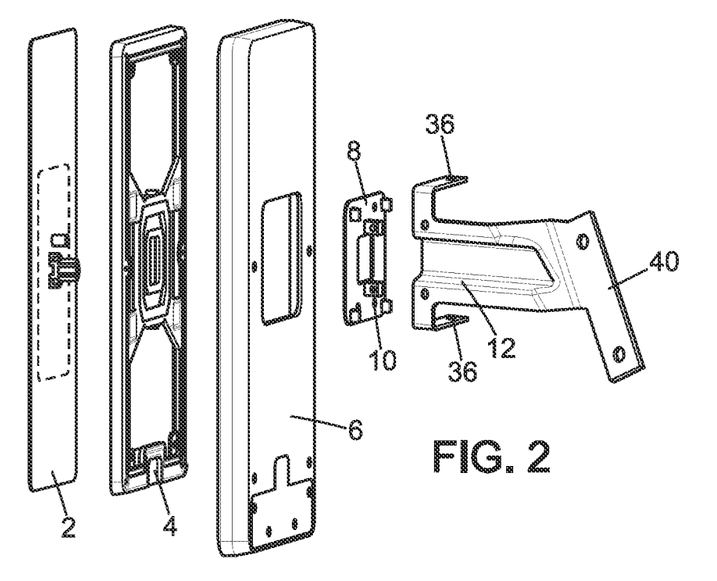
FIG. 2 is an exploded view in perspective of an example attachment for a display for use in a vehicle, for example the vehicle of FIG. 1.

FIG. 2 shows an exploded view of an example attachment for a display shown on FIG. 1. On this figure, we can see a display 2, a display carrier 4, a cover 6, an adapter plate 8, fixation ears 10 and a rigid bracket 12.

Figure 8:
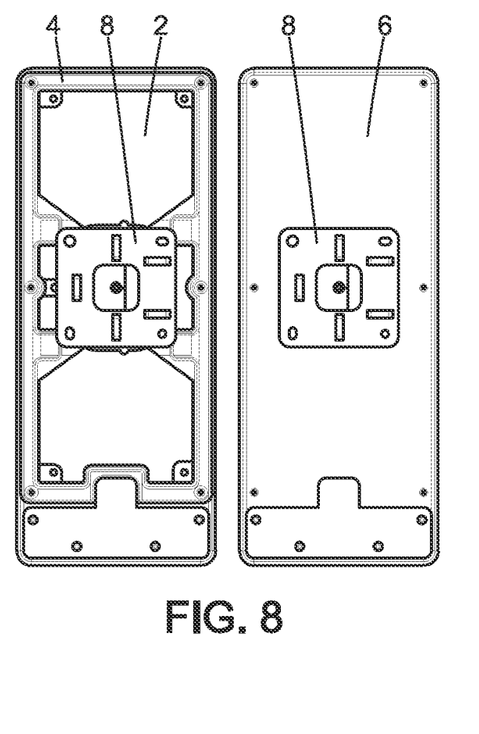
FIG. 8 shows the back side of a display with a display carrier and an adapter plate without and with a cover.
Figure 9:
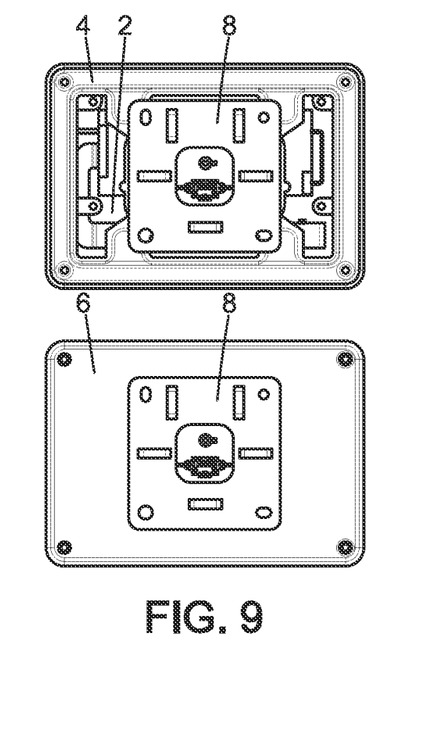
FIG. 9 is a view similar of FIG. 8 for another display.

As can be seen on FIGS. 8 and 9, many kinds of displays 2 can be used in cooperation with an attachment according to the present disclosure. These figures show a 12" display and a 7" display. As suggested by these figures, the display 2 can be used in portrait mode or in landscape mode. This applies to both displays (FIGS. 8 and 9).

The display carrier 4 is a part that is adapted to the display 2. It is an interface that can be fixedly mounted on a back side (opposite to a screen) of the display. In the examples shown on FIGS. 2, 8 and 9, the display carrier 4 comprises a frame 14 and a central flange 16. The frame 14 may be screwed onto the back portion of the display 2 if the structure of the display 2 allows a screwed fixation. In another example, the frame 14 may be clamped on the back portion and/or on the edges of the display 2.

The central flange 16 is connected with the frame 14 and is adapted for receiving the adapter plate 8. The central flange 16 may for example comprise threaded bores, for example four threaded bores, to receive the adapter plate 8 in a screwed construction. The display 2 comprises at least a connector for receiving data and/or current. Advantageously, the central flange 16 surrounds the at least one connector of the display.

The cover 6 is a cap covering at least partially the back portion of the display 2 and the display carrier 4. It has an esthetic function but also a protective function for the display 2. The cover 6 may be a plastic cover with a snap-on mounting. It comprises at least an opening 18 on the one side for the mechanical connection between the display and the rigid bracket 12 and on the other side for the electrical connection of the display 2.

Figure 10:
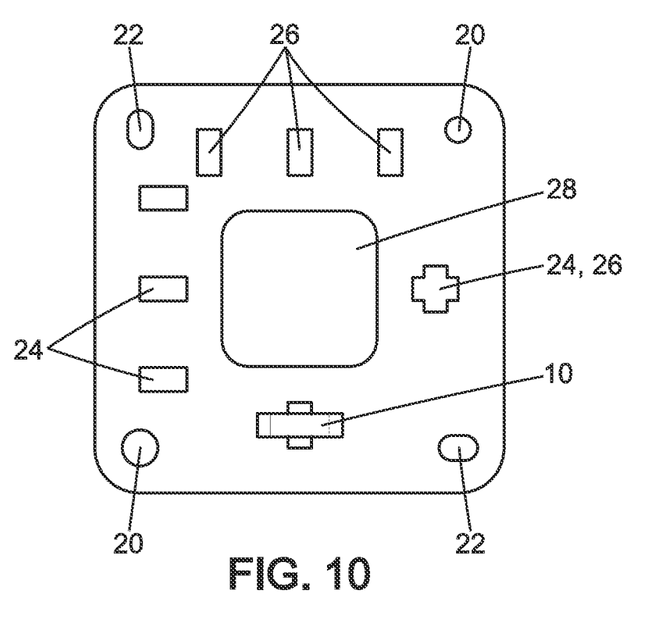
FIG. 10 is an enlarged front view of an adapter plate with a fixation ear.
Figure 11:
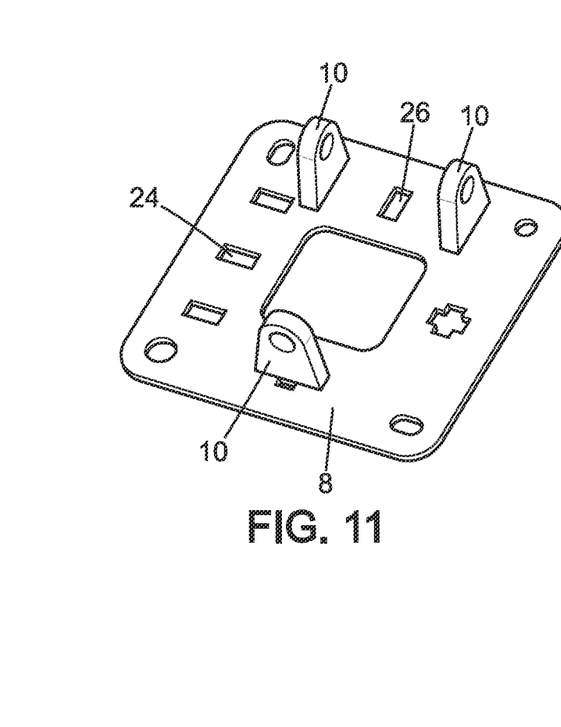
FIG. 11 is a perspective view of an adapter plate with three fixation ears, FIG. 12 corresponds to FIG. 11 viewed under another perspective angle.
Figure 12:
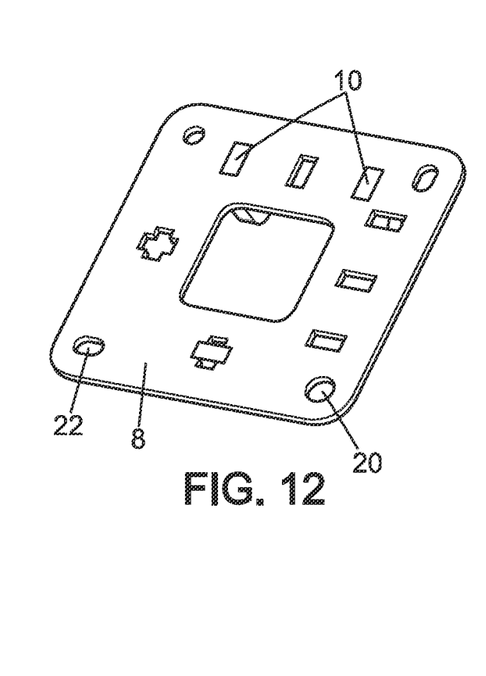

The adapter plate 8 is shown more in detail on FIGS. 10-12. This adapter plate 8 is advantageously a piece which can be used for all kinds of displays 2 and all kinds of rigid brackets 12 for attachments according to the present disclosure.

The adapter plate 8 may be obtained by cutting a sheet of metal. In this case, the adapter plate 8 is a plane piece. It may be a rectangular or a square piece. Its angles may be rounded.

Adapter plate 8 could also be injection molded or metal casted.

The adapter plate 8 may comprise circular bores 20, slotted holes 22, first slots 24, second slots 26 and a central opening 28.

The adapter plate shown on FIGS. 10-12 is a square shaped plate with rounded corners. It comprises two circular bores 20 placed near of two opposite corners. Both other corners of the plate are fitted each with a slotted hole 22. The slotted holes 22 are oriented in two perpendiculars directions. Circular bores 20 and slotted holes 22 correspond with the threaded bores of the central flange of display carrier 4 so that adapter plate 8 can be screwed on the display carrier 4 through circular bores 20 and slotted holes 22.

Advantageously, first slots 24 and second slots 26 are similar with a same length and a same width. First slots 24 are oriented in a first direction and second slots 26 are oriented in a second direction. The first direction may be oriented parallel to an edge of the adapter plate 8. The second direction may be perpendicular to the first direction. A first slot may cross a second slot. At least one first slot 24 may be aligned with another first slot 24. At least one second slot 26 may be aligned with another second slot 26.

The adapter plate 8 shown on FIGS. 10-12 comprises a central opening 28 having also a squared form. It further comprises a first row of first slots 24 aligned between a first edge of the adapter plate 8 and the central opening 28, a second row of second slots 26 aligned between a second edge, adjacent to the first edge, and the central opening 28. A first cross formed by a first slot 24 and a second slot 26 is cut in the adapter plate between a third edge and the central opening 28. The first slot of the first cross is aligned with a first slot 24 of the first row. A second cross formed by a first slot 24 and a second slot 26 is cut in the adapter plate between a fourth edge and the central opening 28. The second slot of the second cross is aligned with a second slot 26 of the second row. On FIGS. 10-12, each row of slots contains three slots.

Figure 13:
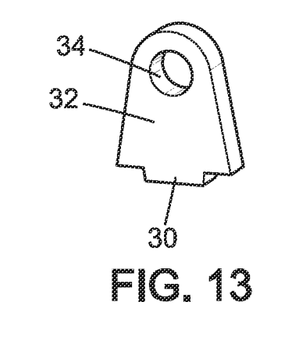
FIG. 13 is a perspective view of a fixation ear.
Figure 14:
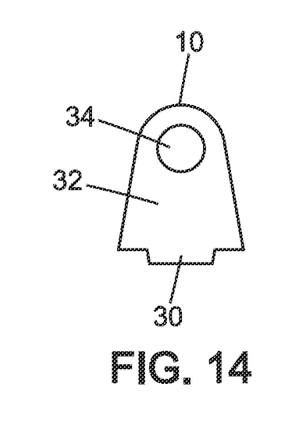
FIG. 14 is a front view of the fixation ear of FIG. 13.

FIGS. 13 and 14 show a same fixation ear 10.

A fixation ear 10 may be made from a metal sheet by cutting. The fixation ears 10 may be made from the same metal as the adapter plate 8. Fixation ears 10 may also be injection molded or metal casted.

The fixation ears 10 are preferably similar.

A fixation ear 10 may comprise a base 30 and a body 32. The base 30 is adapted to fit into a first slot 24 or a second slot 26. The body 32 of a fixation ear 10 is fitted with a fixing bore 34. A fixation ear 10 may comprise a shoulder between the base 30 and the body 32 to define the position of the fixation ear 10 into a slot on the adapter plate 8. In some examples, a plurality of slots 24, 26 is provided on the adapter plate 8. Two or more fixation ears 10 are selectively provided on two or more slots of the plurality of slots 24, 26 based on desired orientation of the display 2. Thus, a single adapter plate can be manufactured for multiple applications, as slots can be selected based on application. A fixation ear each can be fixedly coupled to the selected slots.

A fixation ear 10 may be welded into a slot of the adapter plate 8. In another example, a fixation ear 10 may be crimped into a slot of the adapter plate 8.

FIGS. 11 and 12 show a set of three ears 10 welded on the adapter plate 8.

The rigid bracket 12 may form a link between the adapter plate 8 and the A-pillar 400. The rigid bracket 12 may comprise two opposite ends. A first end may be adapted to cooperate with fixation ears 10 mounted on the adapter plate 8. A second end may be adapted to cooperate with the A-pillar 400.

The first end of the rigid bracket is fitted with two flat angle brackets 36. In some examples, one or more flat angle brackets may be used based on display size and other load and/or mounting parameters. Each flat angle bracket 36 has a first arm and a second arm. Each arm has a fixation bore intended to cooperate with a fixing bore 34 of a fixation ear 10. Both first arms are aligned in a plane and both second arms extend both perpendicularly to the first arms on a same side of the plane containing both first arms.

The first end of the rigid bracket 12 may also comprise a section 38 with a U-shaped cross-section. This section 38 may also comprise fixation bores intended to cooperate with a fixing bore 34 of a fixation ear 10.

The second end of the rigid bracket may comprise a pillar flange 40, eventually fitted with bores. The pillar flange 40 may be welded, or screwed, or glued on the A-pillar 400. Preferably, the pillar flange 40, and more generally the rigid bracket 12, is mounted on the BIW (body in white) of the vehicle.

Figure 3:
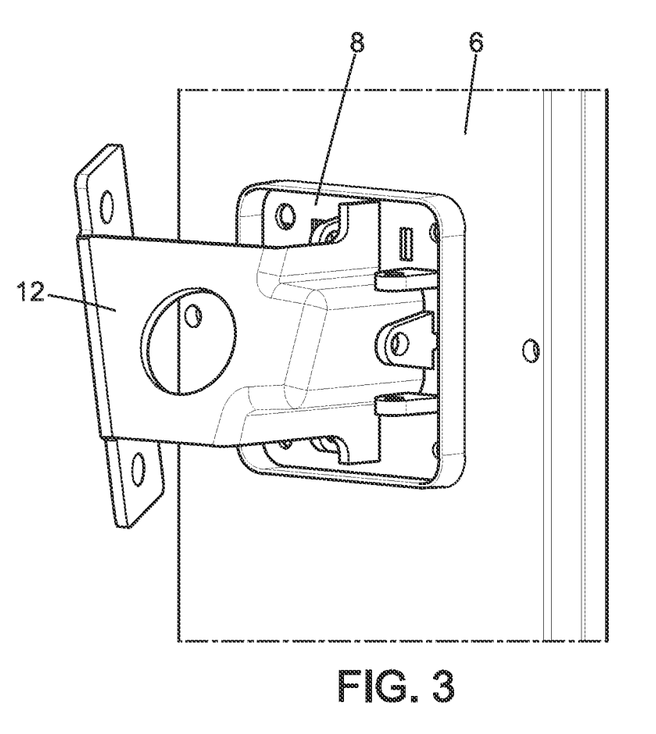
FIG. 3 is a detailed view of the back of a display with an example attachment.

FIG. 3 shows a first example of a fixation between the rigid bracket 12 and the adapter plate 8. In this case, the rigid bracket 12 is rigidly mounted on the adapter plate 8: three fixation ears 10 cooperate with section 38 of the rigid bracket 12 and the fixation bores of the first arms of the flat angle bracket cooperate each with a fixing bore 34 of a fixation ear 10.

Figure 4:
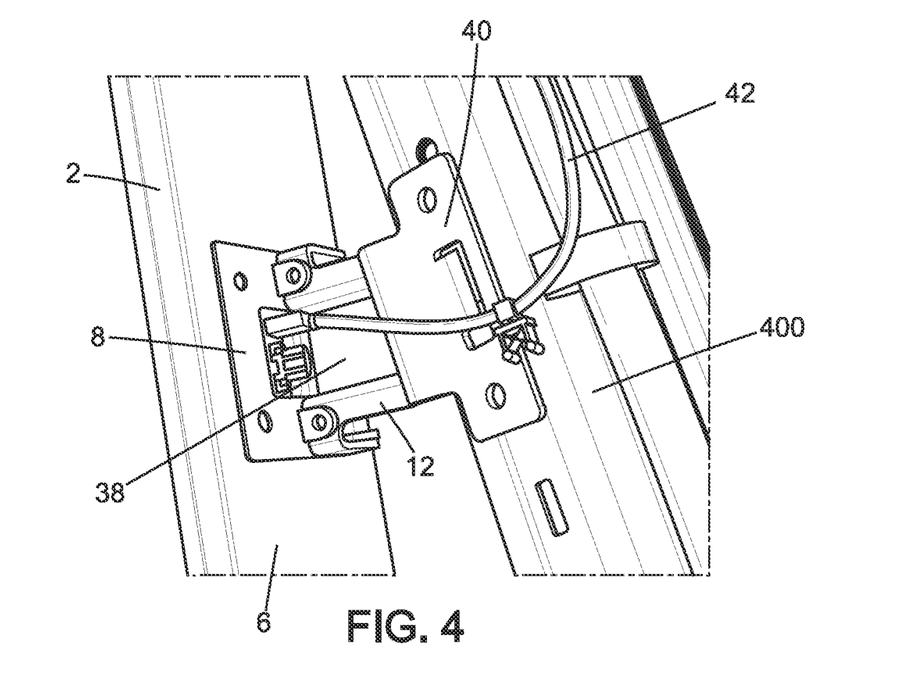
FIG. 4 is a detailed view showing the mounting on a A-pillar and the connection of a display with an example attachment.

FIG. 4 shows an electrical connection of the display 2. An electric cable 42 is connected to the display 2. It runs along the A-pilar 400 and the rigid bracket 12. In some examples, the rigid bracket 12 comprises a cable clip configured to support at least one cable, such as cable 42, being connected to the display 2. In this example, the rigid bracket is mounted on the adapter plate 8 with four fixation ears 10. Both arms of both flat angle brackets cooperate each with fixation ears 10 mounted accordingly on the adapter plate 8.

Figure 5:
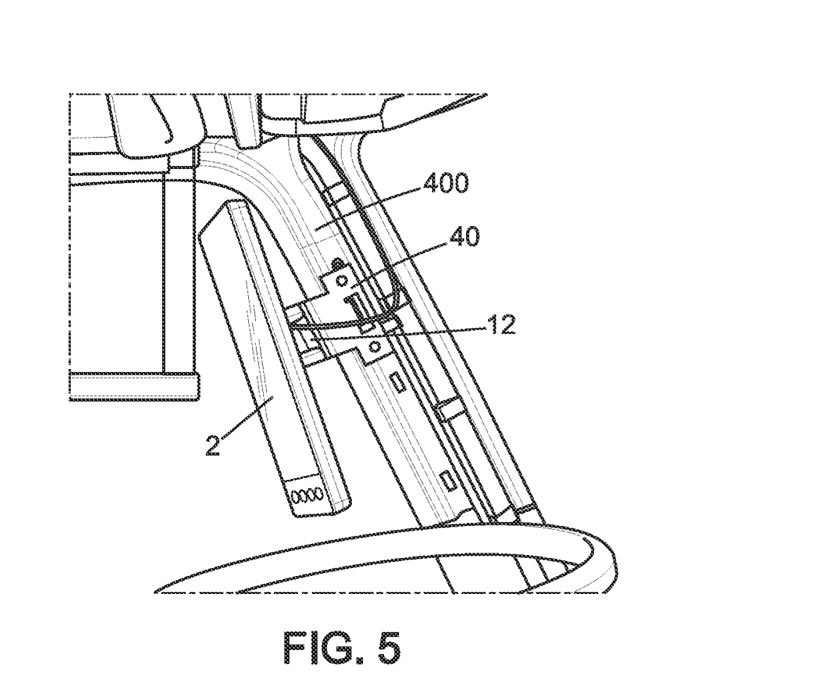
FIG. 5 is another perspective view of a display mounted on an A-pillar.

FIG. 5 corresponds to the example of FIG. 4 but shows the screen of the display 2.

Figure 6:
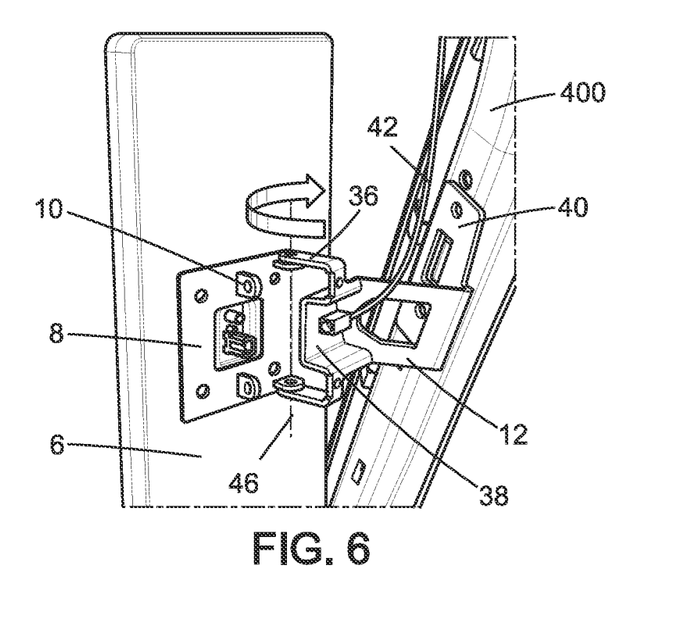
FIG. 6 shows the display of FIG. 5 in a pivoted position.

FIG. 6 shows a display 2 pivoting around the rigid bracket 12. The two fixation bores of the second arms of the flat angle brackets 36 are aligned and form an axis 46. Thus axis 46 can be the axis of rotation of the display 2. The second arms of the flat angle brackets 36 may be mounted pivotally on two corresponding fixation ears 10.

Figure 7:
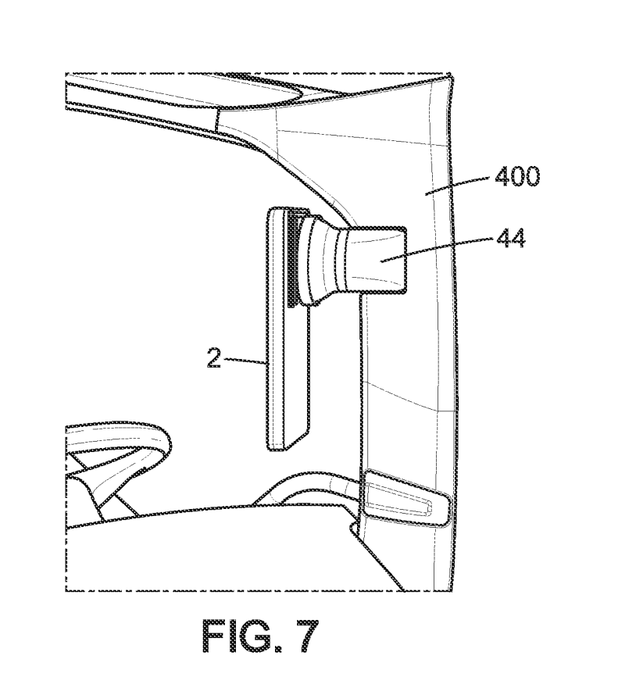
FIG. 7 shows another example of a display with attachment mounted on a A-pillar.

FIG. 7 shows another example of an attachment. In this example, the adapter plate 8 is not in a central position in regard to the display. It can be also remarked that a second cover 44 surrounds the rigid bracket 12.

The described examples of an attachment allowing a display position in close proximity to an A-pillar so that the driver can view display content while driving vehicle or in living mode. This display could be used to see surroundings, for example it could replace mirror or enhance view outside of vehicle with help of cameras. The display can be set to drivers' own preferences.

The attachment proposed in the present disclosure comprises an "universal" adapter plate and "universal" fixation ears minimizing the amount of unique components. Only the display carrier and the cover of the display are unique components. Rigid brackets are designed for all displays, but it could be necessary to have several rigid brackets for adaptation to the A-pillar. This structure decreases the part and tool cost and the environmental footprint.

According to the concept presented in the present disclosure, an amount of fixation ears is attached to a base plate (adapter plate) in the positions that are needed for the wished application and the chosen interface. The fixation ears can be fixated to the base plate by clips, welding, screwing, crimping, . . . .

The base plate (adapter plate) with the needed interface is then fixated to the unit that will be attached into the cabin of the vehicle to the A-pillar.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. An attachment of a display for use in a vehicle, comprising:
    a rigid bracket having a first end with a connecting flange and a second end with at least one flat angle bracket;
    a display carrier configured to support the display; and
    an adapter plate with a plurality of slots and a plurality of fixation ears, each fixation ear of the plurality of fixation ears being fixedly mounted into a corresponding slot of the plurality of slots, wherein the adapter plate is mounted on the display carrier, wherein at least one fixation ear cooperates with a respective one flat angle bracket of the at least one flat angle bracket for mounting the display carrier, and wherein each fixation ear comprises a base adapted to fit into a slot and comprises a body with a fixing hole.

2. The attachment of claim 1, wherein the at least one flat angle bracket comprises two flat angle brackets, each flat angle bracket comprises a first arm and a second arm, wherein both first arms of the two flat angle brackets are arranged in a same plane and are aligned, and wherein both second arms of the two flat angle brackets are parallel to each other and extend towards a same side of the rigid bracket.

3. The attachment of claim 2, wherein the second arms of the flat angle brackets comprise fixation bores, and the fixation bores are aligned along an axis about which the adapter plate is pivotable.

4. The attachment of claim 2, wherein each fixation ear has a fixing hole, wherein each first arm and each second arm has fixation bores, and wherein each fixing hole of the fixation ears is coaxial with a fixation bore of one of the first arm or the second arm.

5. The attachment of claim 1, wherein the display carrier comprises at least one threaded hole, and wherein the adapter plate comprises at least one fixing hole being coincident with the at least one threaded hole.

6. The attachment of claim 1, wherein the plurality of slots of the adapter plate comprises a first set of slots extending in a first direction and a second set of slots extending in a second direction perpendicular to the first direction, wherein the plurality of fixation ears is adapted to be fixedly mounted into the first set of slots to enable mounting of the display carrier in a first direction, and wherein the plurality of fixation ears is adapted to be fixedly mounted into the second set of slots to enable mounting of the display carrier in a second direction.

7. The attachment of claim 1, wherein the adapter plate comprises a central opening, and a back portion of the display comprises at least one connector being accessible through the central opening.

8. The attachment of claim 1, wherein the adapter plate and the plurality of fixation ears are made from the same metal and are welded together.

9. The attachment of claim 1, wherein the attachment further comprises a first cover at least partially covering the display carrier and a back portion of the display.

10. The attachment of claim 9, wherein the attachment further comprises a second cover at least partially covering the rigid bracket.

11. The attachment of claim 7, wherein the central opening of the adapter plate surrounds the at least one connector.

12. A vehicle comprising:
    a display;
    an attachment for the display, the attachment comprising:
        a rigid bracket having a first end with a connecting flange and a second end with at least one flat angle bracket;
        a display carrier configured to support the display; and
        an adapter plate with a plurality of slots and a plurality of fixation ears, each fixation ear of the plurality of fixation ears being fixedly mounted into a corresponding slot of the plurality of slots, wherein the adapter plate is mounted on the display carrier, wherein at least one fixation ear cooperates with a respective one flat angle bracket of the at least one flat angle bracket for mounting the display carrier, and wherein each fixation ear comprises a base adapted to fit into a slot and comprises a body with a fixing hole.

13. The vehicle of claim 12, wherein the connecting flange of the rigid bracket is coupled on an A-pillar of the vehicle.

14. The vehicle of claim 12, wherein the connecting flange of the rigid bracket is fixed on a body-in-white component of the vehicle.

15. The vehicle of claim 12, wherein at least one cable is connected to the display, and wherein the rigid bracket comprises a cable clip configured to support the at least one cable.

16. The vehicle of claim 12, wherein the plurality of fixation ears engages a selected set of the plurality of slots in accordance with a selected orientation of the display.

17. An attachment of a display for use in a vehicle, comprising:
    a rigid bracket having a first end with a connecting flange and a second end with at least one flat angle bracket;
    a display carrier configured to support the display; and
    an adapter plate with a plurality of slots and a plurality of fixation ears, each fixation ear of the plurality of fixation ears being fixedly mounted into a corresponding slot of the plurality of slots, wherein the adapter plate is mounted on the display carrier, wherein at least one fixation ear cooperates with a respective one flat angle bracket of the at least one flat angle bracket for mounting the display carrier, wherein the plurality of slots of the adapter plate comprises a first set of slots extending in a first direction and a second set of slots extending in a second direction perpendicular to the first direction, wherein the fixation ears are adapted to be fixedly mounted into the first set of slots to enable mounting of the display carrier in a first direction, and wherein the fixation ears are adapted to be fixedly mounted into the second set of slots to enable mounting of the display carrier in a second direction.

18. A vehicle comprising:
a display;
an attachment for the display, the attachment comprising:
a rigid bracket having a first end with a connecting flange and a second end with at least one flat angle bracket;
a display carrier configured to support the display; and
an adapter plate with a plurality of slots and a plurality of fixation ears, each fixation ear of the plurality of fixation ears being fixedly mounted into a corresponding slot of the plurality of slots, wherein the adapter plate is mounted on the display carrier, wherein at least one fixation ear cooperates with a respective one flat angle bracket of the at least one flat angle bracket for mounting the display carrier, wherein the plurality of slots of the adapter plate comprises a first set of slots extending in a first direction and a second set of slots extending in a second direction perpendicular to the first direction, wherein the fixation ears are adapted to be fixedly mounted into the first set of slots to enable mounting of the display carrier in a first direction, and wherein the fixation ears are adapted to be fixedly mounted into the second set of slots to enable mounting of the display carrier in a second direction.

* * * * *